United States Patent [19]

Andersson et al.

[11] Patent Number: 4,794,770

[45] Date of Patent: Jan. 3, 1989

[54] DEVICE FOR LOCKING A BICYCLE

[76] Inventors: Kenneth Andersson, Grönegatan 8; Bruno Andersson, Furugatan 21, both of S-333 00 Smålandsstenar; Lars Olofsson, Kungsgatan 9 C, S-411 19 Göteborg, all of Sweden

[21] Appl. No.: 186,767

[22] Filed: Apr. 29, 1988

Related U.S. Application Data

[63] Continuation of Ser. No. 826,484, filed as PCT SE85/00202, May 13, 1985, published as WO85/05338, Dec. 5, 1985, abandoned.

[30] Foreign Application Priority Data

May 14, 1984 [SE] Sweden .................. 8402586

[51] Int. Cl.⁴ .............................................. F05B 71/00
[52] U.S. Cl. ........................................ 70/234; 70/235; 211/17; 211/22; 280/295
[58] Field of Search ............... 70/234, 228, 233, 235, 70/236, 225-227; 248/351, 359 G; 280/293, 295, 296; 211/5, 17, 20, 22; 272/73.1, 73

[56] References Cited

U.S. PATENT DOCUMENTS

| 619,646 | 2/1899 | Ward | 280/296 |
|---|---|---|---|
| 701,696 | 6/1902 | Falcina | 280/296 |
| 1,201,465 | 10/1916 | Hewitt | 280/296 |
| 3,749,295 | 7/1973 | Palmer | 70/234 X |
| 3,865,246 | 2/1975 | Lieb et al. | 70/234 X |
| 3,934,436 | 1/1976 | Candlin et al. | 70/234 |
| 3,965,709 | 6/1976 | Belke | 70/227 |
| 3,996,775 | 12/1976 | Waldron | 70/234 |
| 4,033,160 | 7/1977 | Mima | 70/227 X |

FOREIGN PATENT DOCUMENTS

| 547741 | 10/1957 | Canada | 211/22 |
|---|---|---|---|
| 554584 | 11/1984 | Denmark | |
| 132445 | 7/1901 | Fed. Rep. of Germany | 70/234 |
| 3123153 | 12/1982 | Fed. Rep. of Germany | 211/17 |
| 3238404 | 4/1984 | Fed. Rep. of Germany | |
| 526748 | 7/1921 | France | 70/235 |
| 8101926 | 11/1982 | Netherlands | 211/5 |
| 21868 | of 1895 | United Kingdom | 211/22 |
| 1948 | of 1897 | United Kingdom | 70/228 |

Primary Examiner—Lloyd A. Gall
Attorney, Agent, or Firm—Steele, Gould & Fried

[57] ABSTRACT

A device for locking a bicycle (1) provided with a bicycle lock (18) has a stand (2) and a member (3) fixed thereon and adapted to cooperate with the bicycle lock (18) in such a manner that the member (3), together with the bicycle lock (18) in the locking position thereof, ensures locking of the bicycle (1) to the stand (2). The stand (2) has a part (5b) along which said member (3) is displaceable for vertical adjustment. Said member (3) is adapted to engage one seat stay (16) of the bicycle (1) adjacent the bicycle lock (18) in order to hold the bicycle and has a through opening (12) which is designed for receiving the locking element (17) of the bicycle lock (18).

9 Claims, 2 Drawing Sheets

DEVICE FOR LOCKING A BICYCLE

This is a continuation, of application Ser. No. 826,484, filed as PCT SE85/00202 on May 13, 1985, published as WD85/05338 on Dec. 5, 1985, now abandoned.

The present invention relates to a device for locking a bicycle provided with a bicycle lock.

Bicycles are generally provided with a bicycle lock which is fixed on the bicycle and the locking element of which is adapted, in the locking position of the bicycle lock, to extend through one wheel of the bicycle, normally the rear wheel, to prevent rotation thereof and, hence, unauthorized use of the bicycle. For locking a bicycle, use is sometimes made of a lock of the wire cable type which is an element separate from the bicycle and may be used in the same way as the above-mentioned bicycle lock for locking one wheel of the bicycle, but which may also be used for locking the bicycle to an object, such as a cycle stand.

The first-mentioned bicycle lock while preventing or at least making the use of the bicycle more difficult yet suffers from the drawback of not locking the bicycle to any object, e.g. a stationary cycle stand. The bicycle may therefore easily be stolen simply by being carried away. The cable lock, on the other hand, may be used for locking the bicycle to an object. However, prior art locks of the cable type can easily be broken up, this impairing the locking efficiency.

A prior art device disclosed in Swedish patent application No. 8202685-7 has been developed to eliminate these drawbacks. This known device comprises a locking arrangement fixed on a stand and intended to be secured about a portion of the bicycle frame, preferably the head tube of the bicycle, by means of a separate lock, such as a padlock. To make this device truly useful the bicycle-rider must always carry along his own separate lock for securing the locking arrangement about the bicycle frame portion.

The object of the present invention is to provide a device for locking a bicycle provided with a bicycle lock, to which device the bicycle can be locked without it being necessary for the bicycle-rider to bring along a separate lock for the purpose contemplated.

According to the present invention, this object is achieved by a device which comprises a stand and a member fixed thereon and adapted to hold the bicycle in an upright position, and which is characterized in that said member further is adapted to cooperate with the bicycle lock in such a manner that said member, together with the bicycle lock in the locking position thereof, ensures locking of the bicycle to the stand.

The essential advantage of the present invention thus resides in using the lock already existing on the bicycle for the locking operation.

The stand preferably has a part along which said member is displaceable for vertical adjustment.

Said member is suitably arranged for engaging a part of the bicycle located adjacent the bicycle lock in order to hold the bicycle and preferably has a through opening which is designed for receiving the locking element of the bicycle lock.

The invention will now be described in greater detail with reference to the accompanying drawings.

Figure 1:
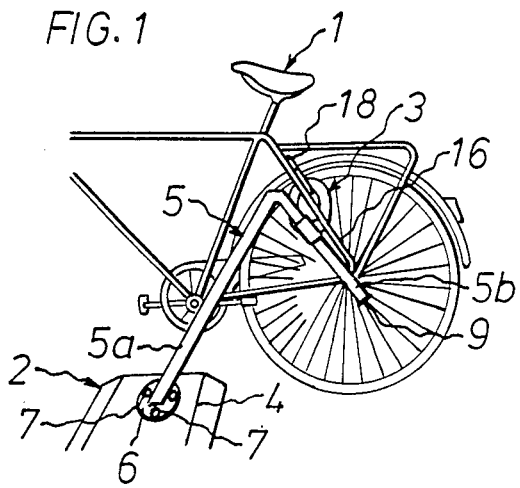
FIG. 1 is a side view showing a device according to the present invention for locking a bicycle.

In FIG. 1, there is shown a bicycle 1 which is locked to a locking device according to the present invention. The illustrated device holds the bicycle 1 in an upright position and thus also serves as a cycle stand. The device has a base or stand 2 and a retainer and engagement member 3.

The stand 2 comprises a bottom plate 4 and a part 5 consisting of a shank or post 5a directed obliquely rearwardly-upwardly and a shank 5b extending obliquely rearwardly-downwardly from the upper end of the first shank 5a. At the lower end of the shank 5a, the part 5 of the stand has a circular fixing plate 6 which is fixedly connected to the bottom plate 4 in a suitable way, in the illustrated example by means of rivets 7. The bottom plate 4 which preferably has a plurality of posts arranged side by side for making it possible to park and lock several bicycles, is made of checker plate in the illustrated example and rests on a supporting structure, e.g. the ground. If it is considered necessary, the bottom plate 4 is secured to the supporting structure. In order to inhibit unauthorized removal, the bottom plate 4 may of course also be made of any other suitable material which is heavier than sheet-metal, for instance concrete.

The retainer and engagement member 3 consists of a sleeve 8 which is displaceable along the shank 5b between its upper end and a stop provided at the lower end of the shank and consisting of a bead 9, of a connecting piece 10 projecting at right angles from the sleeve 8, and of an O-shaped retainer and engagement plate 11 which is substantially parallel to the sleeve 8 and has a central opening 12.

The connecting piece 10 consists of a metal tube 13 which is welded at one end to the sleeve 8 and at the other end fixedly connected to the plate 11, e.g. by riveting. A protective sleeve 14 of rubber is disposed around the tube 13, and a solid rod 15 of tempered steel is placed loosely in the tube 13. The rod 15 makes it more difficult to saw off the connecting piece 10 since it will roll back and forth about its own axis when attempts are made to saw it off.

The retainer and engagement plate 11 is a metal plate which is provided on both sides with a protective rubber coating in order to prevent any damage to the bicycle 1.

Figure 2:
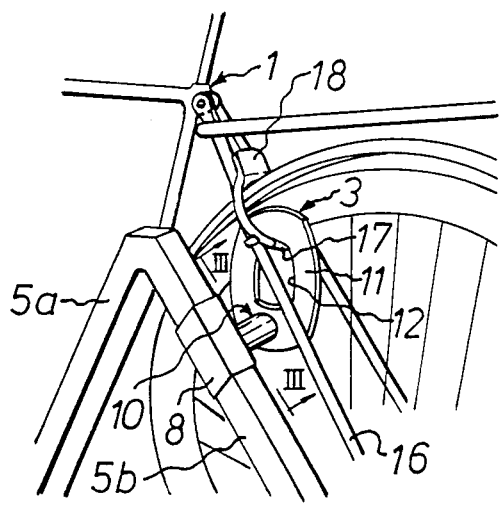
FIG. 2 is a perspective view showing the locking device in more detail.
Figure 3:
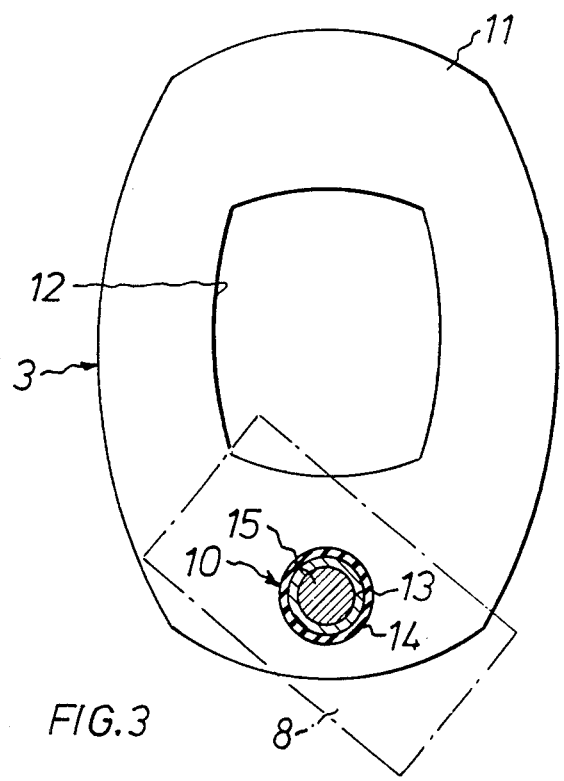
FIG. 3 illustrates a retainer and engagement member included in the locking device in a sectional view taken along the line III—III in FIG. 2, a sleeve part of said member being indicated by dash-dot lines.

As illustrated in FIGS. 1 and 2, the plate 11 is adapted to be inserted behind one seat stay 16 of the bicycle 1 in order to hold the bicycle. The vertical position of the plate 11 is adjusted by displacing the sleeve 8 along the shank 5b such that the locking element 17 of the traditionally mounted lock 18 of the bicycle 1 will pass through the opening 12 of the plate 11 when the bicycle lock 18 is being locked. In this way, the bicycle 1 will be locked to the stand 2. The opening 12 in the plate 11 has such a shape and size that it can receive the locking element of different types of bicycle locks, such as locks of an older type illustrated in FIGS. 1 and 2 and locks of a more modern design referred to as block type locks.

We claim:

1. A device for securing a bicycle, comprising:
a lock rigidly mounted on the bicycle, the lock having a locking element movable along a predetermined locking path to a locked position where the locking element immovably blocks a movable operative part of the bicycle;

a stand having a vertical part defining a first plane, the stand being immovable;

a first member movable vertically on the stand, said first member having a rigid element transversely projecting from said first plane and having a plate-like member attached to a terminal end of said rigid element remote from said first member, said plate-like member defining a second plane that is substantially parallel to said first plane, said plate-like member having an opening therethrough substantially transverse to said first and second planes, said opening adapted to intercept the predetermined locking path, the plate-like member being shaped to capture the movable locking element of the lock and thereby to attach the bicycle to the stand, the plate-like member becoming captive with the rigidly mounted lock.

2. A bicycle securing device for locking with a bicycle lock having a locking element movable along a predetermined locking path to a locked position immovable blocking a moving part of the bicycle relative to a non-moving part of the bicycle, said locking path extending through said moving part and adjacent said non-moving part, the securing device comprising:

an anchored stand with a slidable member positionable on but secured to the stand and movable in a generally vertical first plane that includes a portion of the stand, said slidable member having a rigid element transversely projecting from said first plane and having a plate-like member attached to a terminal end of said rigid element remote from said slidable member, said plate-like member defining a second plane that is substantially parallel to said first plane, said plate-like member having an opening therethrough substantially transverse to said first and second planes, said opening adapted to intercept the predetermined locking path, the plate-like member being shaped to be captured by the locking element of the lock in the locked position, the slidable member being captive on the stand and holding the bicycle upright when captured by the locking element of the lock, whereby the bicycle can be locked to the stand by capturing and locking the locking element and the plate-like member together.

3. The device of claim 2 wherein the stand has a part along which said slidable member is displaceable for generally vertical positioning of the slidable member to intercept said locking path.

4. The device of claim 3, wherein said slidable member is generally vertically displaceable yet captive on said part of the stand by means of a sleeve displaceable along said part of the stand and said plate-like member is fittable against the non-moving part of the bicycle located adjacent the locking path of the locking element of the bicycle lock and said opening receives the locking element of the bicycle lock, whereby moving the locking element to the locked position attaches together said plate-like member, said non-moving and moving parts of the bicycle and said bicycle lock.

5. The device of claim 2, wherein said plate-like member is fittable against the non-moving part of the bicycle adjacent the locking path of the locking element of the bicycle lock and said opening receives the locking element of the bicycle lock, whereby moving the locking element to the locked position attaches together said plate-like member, said non-moving and moving parts of the bicycle and said bicycle lock.

6. The device of claim 5, wherein said plate-like member is fittable against one seat stay of the bicycle, located adjacent the locking path of the locking element, said seat stay being a portion of said non-moving part of said bicycle, whereby said plate-like member and said seat stay are attached together by the lock.

7. The device of claim 2, wherein the slidable member is a sleeve slidable on the stand.

8. The device of claim 7, wherein the plate-like member is a solid connected by connecting piece, that is said rigid element, to the sleeve slidable along the stand.

9. The device of claim 8, wherein the late-like member is O-shaped.

* * * * *

UNITED STATES PATENT AND TRADEMARK OFFICE
CERTIFICATE OF CORRECTION

PATENT NO. : 4,794,770
DATED : January 3, 1989
INVENTOR(S) : Andersson et al.

It is certified that error appears in the above-identified patent and that said Letters Patent is hereby corrected as shown below:

```
Column 4, line 37, after "solid" insert --plate--.
Column 4, line 39, "late" should be --plate--.
```

Signed and Sealed this

Fifteenth Day of August, 1989

Attest:

DONALD J. QUIGG

Attesting Officer

Commissioner of Patents and Trademarks